(12) United States Patent
Barrier

(10) Patent No.: US 11,923,894 B2
(45) Date of Patent: *Mar. 5, 2024

(54) AUTOMATIC OPTICAL TIME-DOMAIN REFLECTOMETER (OTDR)-BASED TESTING OF DEVICE UNDER TEST

(71) Applicant: VIAVI SOLUTIONS INC., Chandler, AZ (US)

(72) Inventor: Julien Barrier, Saint Jean Bonnefonds (FR)

(73) Assignee: VIAVI SOLUTIONS INC., Chandler, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/975,091

(22) Filed: Oct. 27, 2022

(65) Prior Publication Data

US 2023/0050598 A1 Feb. 16, 2023

Related U.S. Application Data

(63) Continuation of application No. 17/164,288, filed on Feb. 1, 2021, now Pat. No. 11,515,938.

(30) Foreign Application Priority Data

Nov. 5, 2020 (EP) .................................. 20306335

(51) Int. Cl.
*H04B 10/071* (2013.01)
*G01M 11/00* (2006.01)

(52) U.S. Cl.
CPC ....... *H04B 10/071* (2013.01); *G01M 11/3109* (2013.01); *G01M 11/3118* (2013.01); *G01M 11/3145* (2013.01)

(58) Field of Classification Search
CPC ............. H04B 10/071; H04B 10/073; H04B 10/0731; G01M 11/02; G01M 11/0207; G01M 11/30; G01M 11/31; G01M 11/3109; G01M 11/3136; G01M 11/3145; G01M 11/3154; G01M 11/3163; G01M 11/3172; G01M 11/3181; G01M 11/319; G01M 11/33; G01M 11/331; G01M 11/332; G01M 11/333; G01M 11/334; G01M 11/335; G01M 11/336; G01M 11/337; G01M 11/338; G01M 11/39
USPC ........................................ 356/73.1
See application file for complete search history.

(56) References Cited

U.S. PATENT DOCUMENTS

| | | |
|---|---|---|
| 5,062,704 A | 11/1991 | Bateman |
| 5,754,284 A | 5/1998 | Leblanc et al. |
| 6,519,026 B1 | 2/2003 | Holland |
| 7,002,735 B2 | 2/2006 | Kobayashi et al. |
| 7,016,024 B2 | 3/2006 | Bridge et al. |
| 8,711,341 B2 | 4/2014 | Blair et al. |

(Continued)

FOREIGN PATENT DOCUMENTS

| | | |
|---|---|---|
| FR | 2751746 A1 | 1/1998 |
| JP | 2020051797 A | 4/2020 |

*Primary Examiner* — Gordon J Stock, Jr.

(74) *Attorney, Agent, or Firm* — Mannava & Kang, P.C.

(57) ABSTRACT

In some examples, automatic OTDR-based testing may include determining, based on analysis of a signal that is received from a DUT that is to be monitored, whether the DUT is optically connected. Based on a determination that the DUT is optically connected, a measurement associated with the DUT may be performed.

16 Claims, 12 Drawing Sheets

(56) References Cited

U.S. PATENT DOCUMENTS

| | | |
|---|---|---|
| 9,184,833 B2 | 11/2015 | Kassler |
| 9,709,460 B2 | 7/2017 | Leblanc et al. |
| 10,060,826 B2 | 8/2018 | Lane et al. |
| 10,260,989 B2 | 4/2019 | Hallett et al. |
| 10,862,582 B1 | 12/2020 | L'Heureux et al. |
| 11,271,641 B1 * | 3/2022 | Perron ............... G01M 11/3136 |
| 11,515,938 B2 * | 11/2022 | Barrier ............... G01M 11/3109 |
| 2008/0297773 A1 | 12/2008 | Blair et al. |
| 2015/0062562 A1 | 3/2015 | Kassler |
| 2015/0198503 A1 | 7/2015 | Leblanc et al. |
| 2015/0280813 A1 | 10/2015 | Lee |
| 2018/0058981 A1 | 3/2018 | Hallett et al. |
| 2018/0234174 A1 | 8/2018 | Courter et al. |
| 2018/0283985 A1 | 10/2018 | Lönne |
| 2020/0072703 A1 | 3/2020 | Roux et al. |
| 2020/0240872 A1 | 7/2020 | Murakami |
| 2021/0255056 A1 | 8/2021 | Xu |

* cited by examiner

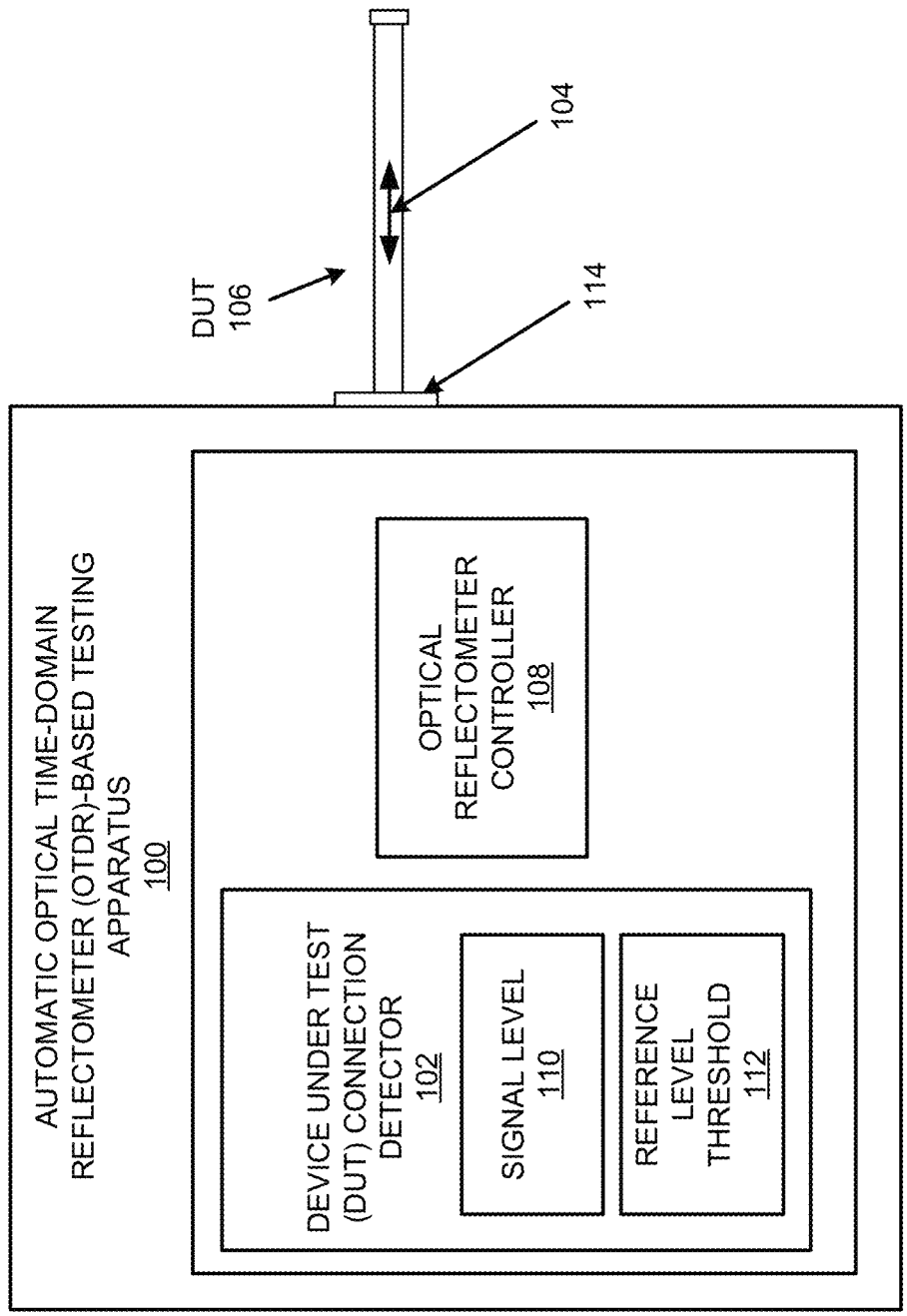

900

---

DETERMINE, BASED ON ANALYSIS OF AN EMITTING SIGNAL THAT IS RECEIVED FROM AN OPTICAL TIME-DOMAIN REFLECTOMETER (OTDR) THAT IS OPTICALLY CONNECTED TO A DEVICE UNDER TEST (DUT) THAT IS TO BE MONITORED, WHETHER A FIRST END OF THE DUT IS OPTICALLY CONNECTED TO A CONNECTION PORT AND A SECOND OPPOSITE END OF THE DUT IS OPTICALLY CONNECTED TO THE OTDR
902

↓

PERFORM, BASED ON A DETERMINATION THAT THE DUT IS OPTICALLY CONNECTED TO THE CONNECTION PORT AND TO THE OTDR, A MEASUREMENT ASSOCIATED WITH THE DUT
904

*FIG. 9*

AUTOMATIC OPTICAL TIME-DOMAIN REFLECTOMETER (OTDR)-BASED TESTING OF DEVICE UNDER TEST

PRIORITY

The present application is a Continuation under 35 U.S.C. § 120 of co-pending U.S. patent application Ser. No. 17/164,288, filed Feb. 1, 2021, which claims priority under 35 U.S.C. 119(a)-(d) to European patent application number 20306335.9, having a filing date of Nov. 5, 2020, the disclosures of which are hereby incorporated by reference in their entireties.

BACKGROUND

A fiber optic cable may include one or more optical fibers that may be used to transmit light from a source to a destination. The optical fibers of the fiber optic cable may be referred to as fiber optic links. Fiber optic cables may represent a network element of a fiber optic network. In this regard, other types of network elements may include optical connectors, optical splices, optical couplers, and optical switches. A fiber optic network may be monitored, for example, by a remote fiber monitoring system that enables oversight of an entire fiber optic network from a central location. An optical reflectometer such as an Optical Time Domain Reflectometer (OTDR) may be used for testing fiber optic links, and thus a fiber optic cable. The OTDR may operate by sending an optical pulse into the fiber optic link under test, and analyze the return signal that includes Rayleigh backscatter and reflection signals. The return signal may be analyzed to determine optical losses along the fiber optic link as well as reflectance from reflective events. OTDRs may be used, for example, in a stand-alone mode, in a remote controlled mode, or integrated in Telecom or fiber monitoring systems.

BRIEF DESCRIPTION OF DRAWINGS

Features of the present disclosure are illustrated by way of example and not limited in the following figure(s), in which like numerals indicate like elements, in which:

FIG. 1 illustrates an architectural layout of an automatic OTDR-based testing apparatus in accordance with an example of the present disclosure;

FIG. 9 illustrates a flowchart of an example method for automatic OTDR-based testing in accordance with an example of the present disclosure.

DETAILED DESCRIPTION

Figure 2A:
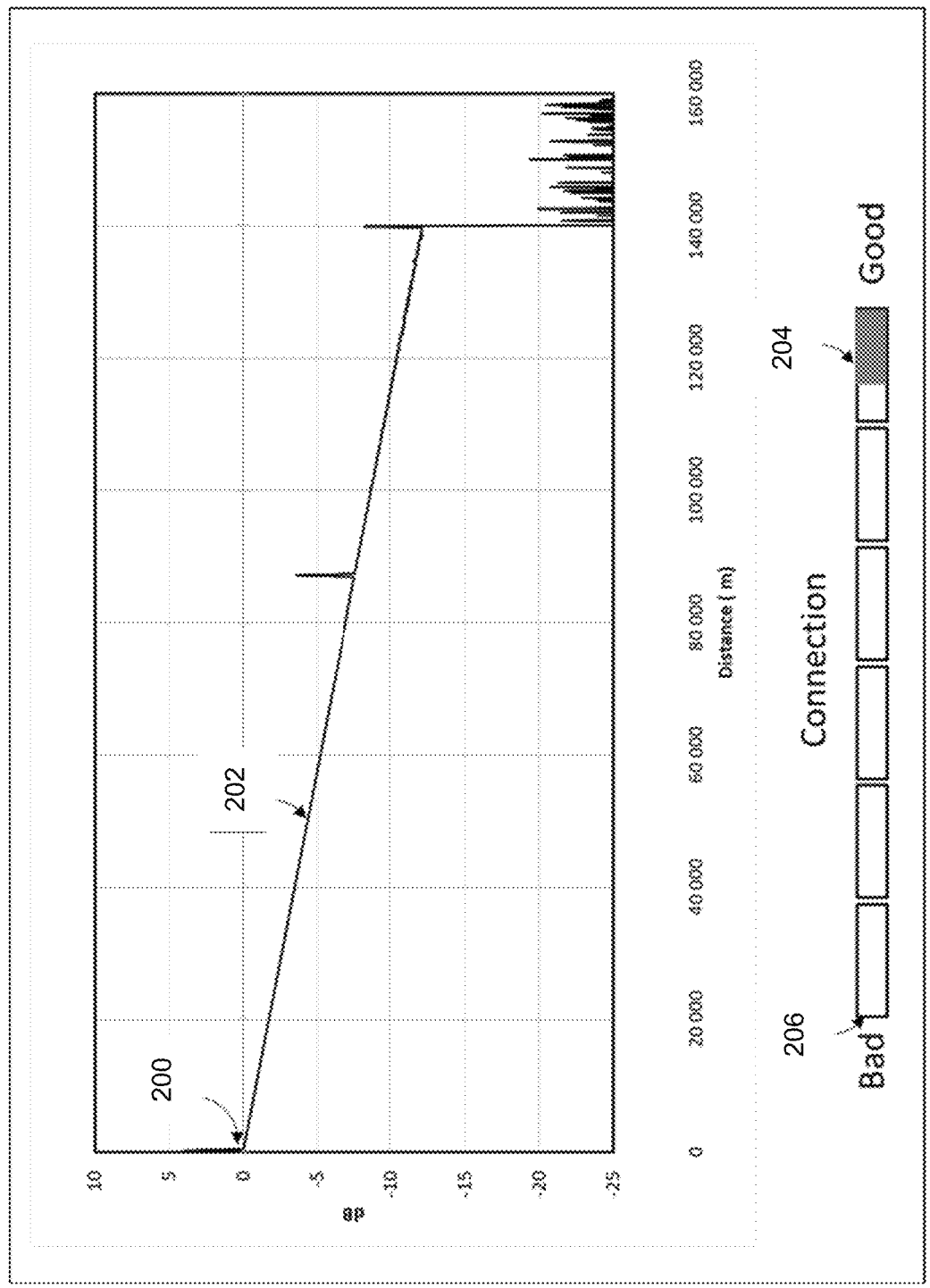
FIG. 2A illustrates a case of a correct optical connection.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Automatic OTDR-based testing apparatuses, methods for automatic OTDR-based testing, and non-transitory computer readable media for automatic OTDR-based testing are disclosed herein. The apparatuses, methods, and non-transitory computer readable media disclosed herein provide for reduction of the total duration of OTDR measurements performed on multiple fiber optic links by reducing, or effectively eliminating, the time associated with manual initiation of acquisitions. In this regard, the apparatuses, methods, and non-transitory computer readable media disclosed herein may utilize permanent (or real-time) OTDR monitoring in order to determine whether a fiber optic link has just been physically connected to the OTDR.

With respect to OTDR based monitoring of a fiber optic link, for a fiber optic cable that includes a plurality of fiber optic links, after each connection of the OTDR to a fiber optic link that is to be measured, the OTDR or OTDR based system user may select an option on the OTDR to start the measurement. This procedure linked to a systematic validation may depend on the availability and reactivity of the operator, and leads to additional time that is needed to perform each measurement. The overall time needed to perform a measurement increases based on an increase in a number of fiber optic links, and can be substantial for a fiber optic cable that may include tens, hundreds, or thousands of such fiber optic links.

A measurement performed by an OTDR may utilize Rayleigh backscattering and Fresnel reflection signals to monitor events with respect to a fiber optic network. Due to the relatively low level of the Rayleigh signal, multiple acquisitions may need to be accumulated to obtain a useable trace to detect or accurately locate and characterize events.

With respect to modern fiber optic cables, an increase in a number of fiber optic links per fiber optic cable has direct consequences on the characterization time of a fiber optic cable by optical reflectometry. Ribbon fiber optic cables or fiber optic cables with thousands of fiber optic links may be deployed, and the test time per fiber optic link of a fiber optic cable may be specified as a criterion for efficiency.

A certain number of repetitive actions call on the operator of an OTDR for validation. Thus, after having connected a fiber optic cable (or fiber optic link thereof) to the OTDR, the operator may need to validate the launch of the OTDR acquisition (e.g., by activating a start key). The operator may effectively verify that the optical connection is effective by launching a brief acquisition that may be denoted a "real time acquisition". This validation operation by the operator can be tedious, and time consuming when it needs to be repeated a large number of times.

The validation operation may need to be performed for stand-alone OTDRs, as well as OTDRs used in a fiber monitoring system. During installation of a fiber monitoring system, a user may need to perform the provisioning of the fiber monitoring system. The provisioning may be performed by plugging several optical fiber links to each port of the fiber monitoring system, and manually measuring the optical fiber links to create reference traces. This process may include connecting several fiber optic links to each port of the OTDR. For each fiber optic link connected to the OTDR, the user may need to manually launch the acquisition of new OTDR traces by pressing a key or equivalent system. It is therefore technically challenging to reduce an overall time needed to perform a measurement associated with the fiber optic link, and particularly to perform measurements associated with a fiber-optic cable that may include several fiber optic links.

In order to address the aforementioned technical challenges, the apparatuses, methods, and non-transitory computer readable media disclosed herein provide for reduction of the total duration of OTDR measurements performed on multiple fiber optic links by reducing the time associated with manual initiation of acquisitions. In this regard, the apparatuses, methods, and non-transitory computer readable media disclosed herein may provide for automatic launching of a reference measurement operation, each time a user connects to a fiber optic link.

FIGS. 2A-4 illustrate general principles associated with reference measurement of an optical fiber link performed by an OTDR, in accordance with an example of the present disclosure.

In general, OTDRs perform an optical connection check at the beginning of acquisition to ensure that the connection to a device under test (DUT), such as a fiber optic link, is good. This estimate of the connection quality can be visualized by a bar graphs of FIGS. 2A and 2B.

Figure 2B:
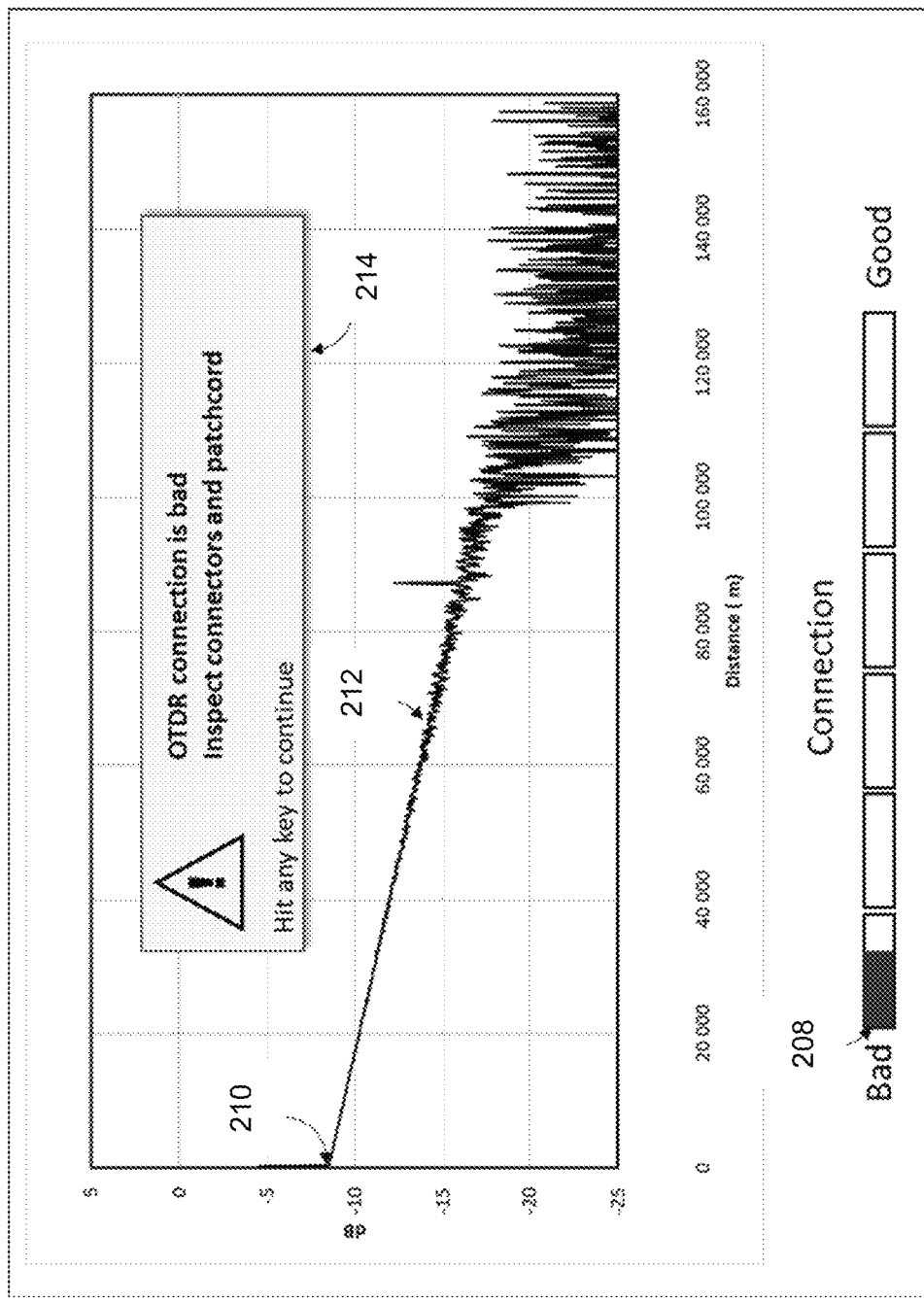
FIG. 2B illustrates a case of an incorrect optical connection, in accordance with an example of the present disclosure.

Specifically, FIG. 2A illustrates a case of a correct optical connection, and FIG. 2B illustrates a case of an incorrect optical connection, in accordance with an example of the present disclosure.

Referring to FIG. 2A, a level at an origin 200 of a backscatter trace 202 is normal around the reference level usually aligned with the 0 dB graduation. The bar graph under the trace displays an optical connection quality qualified as good at 204 (as opposed to bad (or poor) at 206).

The poor connection quality may have different causes such as a dirty, damaged, or an incorrect connection between an OTDR port and a DUT. For example, the case of a DUT cut near the OTDR port or the case of an unconnected DUT may result in display of a bad connection on the bar graph. Abnormal insertion loss such as the presence of a curvature or a fiber bend on a link fiber between the OTDR and the DUT may also result in a bad connection.

On the contrary, in the case represented in FIG. 2B, the bar graph below the trace displays an optical connection quality qualified as bad at 208. The backscatter level at origin 210 has dropped by approximately 8 dB degrading the signal to noise ratio on trace 212. A bad connection may be signaled by a warning message 214, leaving the user with the choice to interrupt or not interrupt the current measurement.

Figure 3:
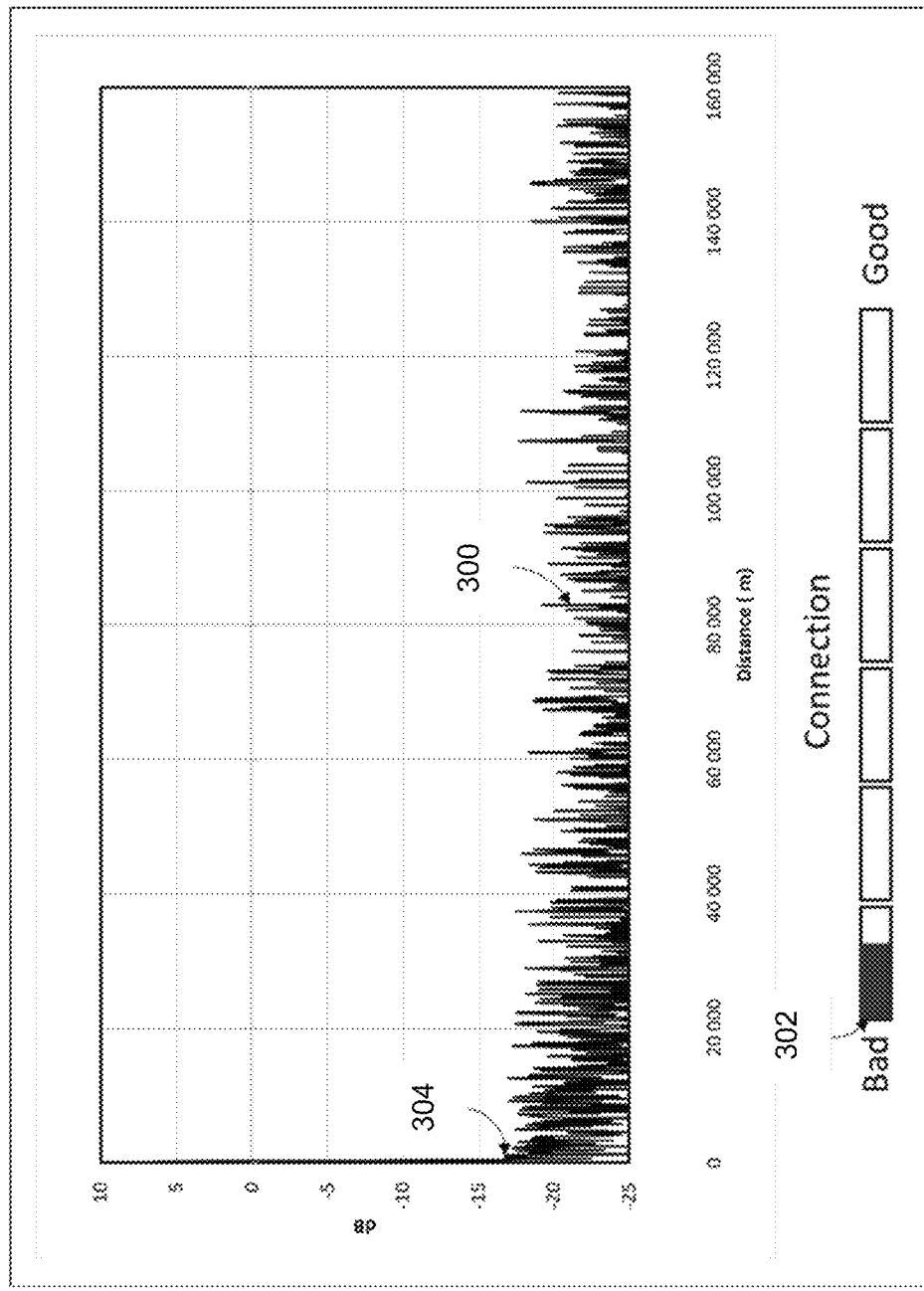
FIG. 3 illustrates an OTDR trace when a device under test is not connected for the duration of the acquisition, in accordance with an example of the present disclosure.

FIG. 3 illustrates an OTDR trace when a DUT, such as a fiber optic link, is not connected for the duration of the acquisition, in accordance with an example of the present disclosure.

For example, FIG. 3 shows an example of an OTDR trace 300 when the DUT is not connected for the duration of the acquisition, resulting in a bad quality connection as illustrated as 302. In this regard, the signal may disappear except in the very first few meters 304 due to the response on an open OTDR output connector, or the OTDR connection patchcord to the DUT.

The quality of the connection may be obtained by estimating the backscatter level at the origin, and comparing the backscatter level with predetermined thresholds. These thresholds may vary from product to product and from manufacturer to manufacturer.

Figure 4:
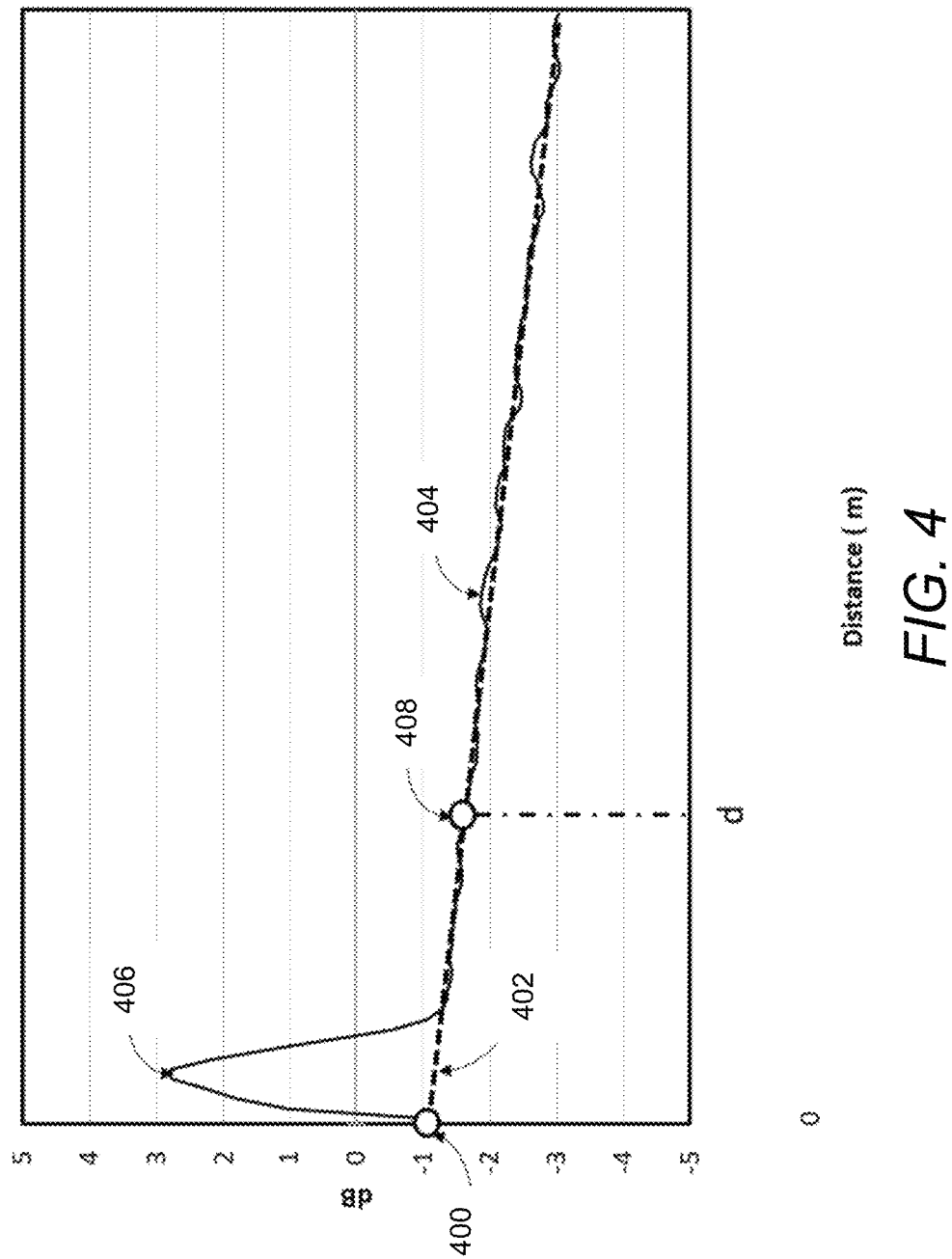
FIG. 4 illustrates examples of techniques that can be used to measure the optical connection quality, in accordance with an example of the present disclosure.

FIG. 4 illustrates examples of techniques that can be used to measure the optical connection quality, in accordance with an example of the present disclosure.

Referring to FIG. 4, different techniques may be used to measure the optical connection quality. The level of backscatter at origin 400, which may be referred to as the injection level, may be estimated by extending up to the horizontal axis a linear regression line 402 applied to a section of a curve 404 by avoiding the back-reflection at point 406. In this regard a reading of the back-scatter level at the start of curve 408 may also be used as a reference as it represents the backscatter level after the first connection between the OTDR and the DUT and therefore may be used as an indicator of the connection quality between the OTDR and the DUT.

Based on the principles disclosed herein with respect to FIGS. 2-4, the apparatuses, methods, and non-transitory computer readable media disclosed herein provide for the automatic launch of an OTDR measurement as soon as the optical connection is effective, and without any intervention by an operator of the OTDR. The apparatuses, methods, and non-transitory computer readable media disclosed herein may provide for a measuring device, such as an OTDR, to detect connection to a fiber optic link to be tested, and therefore immediate commencement of a measurement.

According to examples disclosed herein, the apparatuses, methods, and non-transitory computer readable media disclosed herein may provide for detection of the presence of a fiber optic link connected to the OTDR by performing the analysis of the reflectometric signal, as well as detection at the optical level of an optical connection. Analysis of the signal received by the OTDR may be utilized to determine whether the DUT (e.g., fiber optic link) is optically connected.

According to examples disclosed herein, the apparatuses, methods, and non-transitory computer readable media disclosed herein may provide for detection of the presence of a fiber optic link connected to the OTDR, without any modification of connection devices (e.g., fiber optic connectors).

According to examples disclosed herein, the apparatuses, methods, and non-transitory computer readable media disclosed herein may provide for detection of the presence of a fiber optic link connected to the OTDR by implementing an "auto-start" configuration, where the OTDR continuously performs short real-time duration acquisitions and analyzes the signal to detect the presence of a fiber optic link connected to the OTDR. As soon as the ORDR detects the presence of the optical connection, the OTDR may launch the acquisition (without human intervention) by using acquisition parameters defined during set-up of the acquisition.

According to examples disclosed herein, the apparatuses, methods, and non-transitory computer readable media disclosed herein may be utilized to accelerate the test of multi-fiber fiber optic cables, but also for sequence of measurements on wavelength division multiplexing systems (dense or coarse), as well as bidirectional measurements using two devices (e.g., two OTDRs) or a single device with a fiber loop at the end. In this regard, a fiber loop may be obtained, for example, by using a mirror connected to an end of the fiber optic link as the high reflectivity of the mirror will send back the light in the OTDR direction and enable a bidirectional characterization. Another example of a fiber loop may be obtained when the OTDR is connected to a dual-fiber optic link, such as where an OTDR is connected with fiber optic link-1, and an end of fiber optic link-1 is connected to fiber optic link-2 so that the two fiber optic links connected together loop back to the OTDR location. Performing an OTDR test at each end of this dual-fiber optic link with such a loop at the end may thus be implemented by the apparatus 100.

According to examples disclosed herein, the apparatuses, methods, and non-transitory computer readable media disclosed herein may be applied whenever a measurement needs the connection of a fiber optic link before launching the measurement. This connection may be manual, but may also be carried out automatically (e.g., without human intervention) via the use of an optical switch.

With respect to the rapid increase of the number of fibers to be deployed and tested, according to examples disclosed herein, the apparatuses, methods, and non-transitory computer readable media disclosed herein provide for acceleration testing associated with fiber optic links, and particularly, for a closed project process where parameters may be set prior to plugging the fiber optic link to be tested.

With respect to installation of a monitoring system, a user may need to perform provisioning of a system by plugging the fiber optic links to each port of the system and manually measuring them to create reference traces. In this regard, according to examples disclosed herein, the apparatuses, methods, and non-transitory computer readable media disclosed herein provide for automation of this operation, where each time a user connects a fiber optic link, the reference may be performed without further user intervention.

According to examples disclosed herein, with respect to unidirectional tests, for a single end OTDR that continually performs a real time OTDR acquisition, when a fiber optic link is not connected, the OTDR trace may be a pulse followed by noise. However, when a fiber optic link is connected, the OTDR trace may be a pulse followed by the backscatter of the fiber optic link (denoted injection level). In this regard, the apparatuses, methods, and non-transitory computer readable media disclosed herein provide for detection of injection level for detection of the fiber optic link presence.

According to examples disclosed herein, with respect to bidirectional tests, using two instrument, both instruments may send an optical signal in the fiber optic link. If one of the instruments receives a signal of connection of the fiber optic link as disclosed herein, this signal may be utilized by both instruments as a basis to perform testing of the fiber optic link.

According to examples disclosed herein, the apparatuses, methods, and non-transitory computer readable media disclosed herein may provide for provisioning and referencing of a monitoring system, without human intervention.

For the apparatus, methods, and non-transitory computer readable media disclosed herein, the elements of the apparatus, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

FIG. 1 illustrates an architectural layout of an automatic OTDR-based testing apparatus (hereinafter also referred to as "apparatus 100") in accordance with an example of the present disclosure.

Referring to FIG. 1, the apparatus 100 may include a device under test (DUT) connection detector 102 that is executed by at least one hardware processor (e.g., the hardware processor 802 of FIG. 8, and/or the hardware processor 1004 of FIG. 10), to determine, based on analysis of a signal 104 that is received from a DUT 106 that is to be monitored, whether the DUT 106 is optically connected.

An optical reflectometer controller 108 that is executed by at least one hardware processor (e.g., the hardware processor 802 of FIG. 8, and/or the hardware processor 1004 of FIG. 10) may perform, based on a determination that the DUT 106 is optically connected, a measurement associated with the DUT 106. In this regard, the measurement may be automatically (e.g., without human intervention) performed upon detection of the optical connection.

According to examples disclosed herein, the DUT 106 may include a fiber optic link.

According to examples disclosed herein, the DUT connection detector 102 may determine, based on analysis of the signal 104 that is received from the DUT 106 that is to be monitored, whether the DUT 106 is optically connected by determining, based on analysis of a Rayleigh backscatter power of the signal 104, whether the DUT 106 is optically connected. With respect to utilization of Rayleigh backscatter power to determine whether the DUT 106 is optically connected, if the DUT 106 is connected, a part of the power sent by the apparatus 100 will be reflected and, in particular, the Rayleigh backscattered level will increase because of the fiber of DUT 106. This is also illustrated in FIG. 4 where the DUT is connected, compared to FIG. 3 where no DUT is connected.

According to examples disclosed herein, the DUT connection detector 102 may determine, based on analysis of the signal 104 that is received from the DUT 106 that is to be monitored, whether the DUT 106 is optically connected by determining, based on analysis of a Rayleigh backscatter energy of the signal 104, whether the DUT 106 is optically connected. In a similar manner as disclosed herein with respect to the Rayleigh backscatter power, with respect to utilization of Rayleigh backscatter energy to determine whether the DUT 106 is optically connected, if the DUT 106 is connected, a part of the energy sent by the apparatus 100 will be reflected and, in particular, the Rayleigh backscatter energy will increase because of the fiber of DUT 106.

According to examples disclosed herein, the DUT connection detector 102 may determine, based on analysis of the signal 104 that is received from the DUT 106 that is to be monitored, whether the DUT 106 is optically connected by determining, based on analysis of an Optical Time Domain Reflectometer (OTDR) front end backscatter level of the signal 104, whether the DUT 106 is optically connected. With respect to use of the OTDR front end backscatter level of the signal 104 to determine whether the DUT 106 is optically connected, if no DUT is connected, there is no Rayleigh backscatter level and thus the OTDR front end backscatter level of the signal 104 is very low. When the DUT 106 is connected, this connection results in an increase of the OTDR front end backscatter level of the signal 104, and thus a DUT detection may be obtained by comparing the OTDR front end backscatter level of the signal 104 to a threshold as described below.

According to examples disclosed herein, the DUT connection detector 102 may determine, based on analysis of the signal 104 that is received from the DUT 106 that is to be monitored, whether the DUT 106 is optically connected by determining, based on comparison of a signal level 110 associated with the signal 104 to a reference level threshold 112, whether the DUT 106 is optically connected. For example, referring to FIGS. 2A, 2B, and 3, with respect to the reference level threshold 112, the injection level is approximately 0 dB for a DUT that is properly connected as shown in FIG. 2A. The injection level may be a lower value when a DUT is not connected correctly as shown in FIG. 2B, where the lower value is representative of the insertion loss between the OTDR and the DUT. Further, with respect to FIG. 3, there is no trace and it is not possible to estimate an injection level when there is no DUT connected as shown. Thus, the DUT connection detector 102 may generate, based on a determination that the signal level 110 associated with the signal 104 exceeds the reference level threshold 112, an indication that the DUT 106 is optically connected.

According to examples disclosed herein, the optical reflectometer controller 108 may be executed by the at least one hardware processor to perform, based on a set-up that defines a condition for launch of the measurement, the measurement associated with the DUT 106. With respect to set-up aspects that define a condition for launch of a measurement, an example may include a user pre-defined threshold for quality of a connection that will be compared to the signal level 110 in order to detect if the quality of the connection is acceptable or not before launching a measurement.

According to examples disclosed herein, the apparatus 100 (which may be an OTDR), may include a connection port 114. In this regard, the DUT connection detector 102 may determine, based on analysis of the signal 104 that is received from the DUT 106 that is to be monitored, whether the DUT 106 is optically connected by determining, based on analysis of the signal 104 that is received from the DUT 106 that is to be monitored, whether the DUT is optically connected to the connection port 114.

Operation of the apparatus 100 is described in further detail with reference to FIGS. 5-7B.

Figure 5:
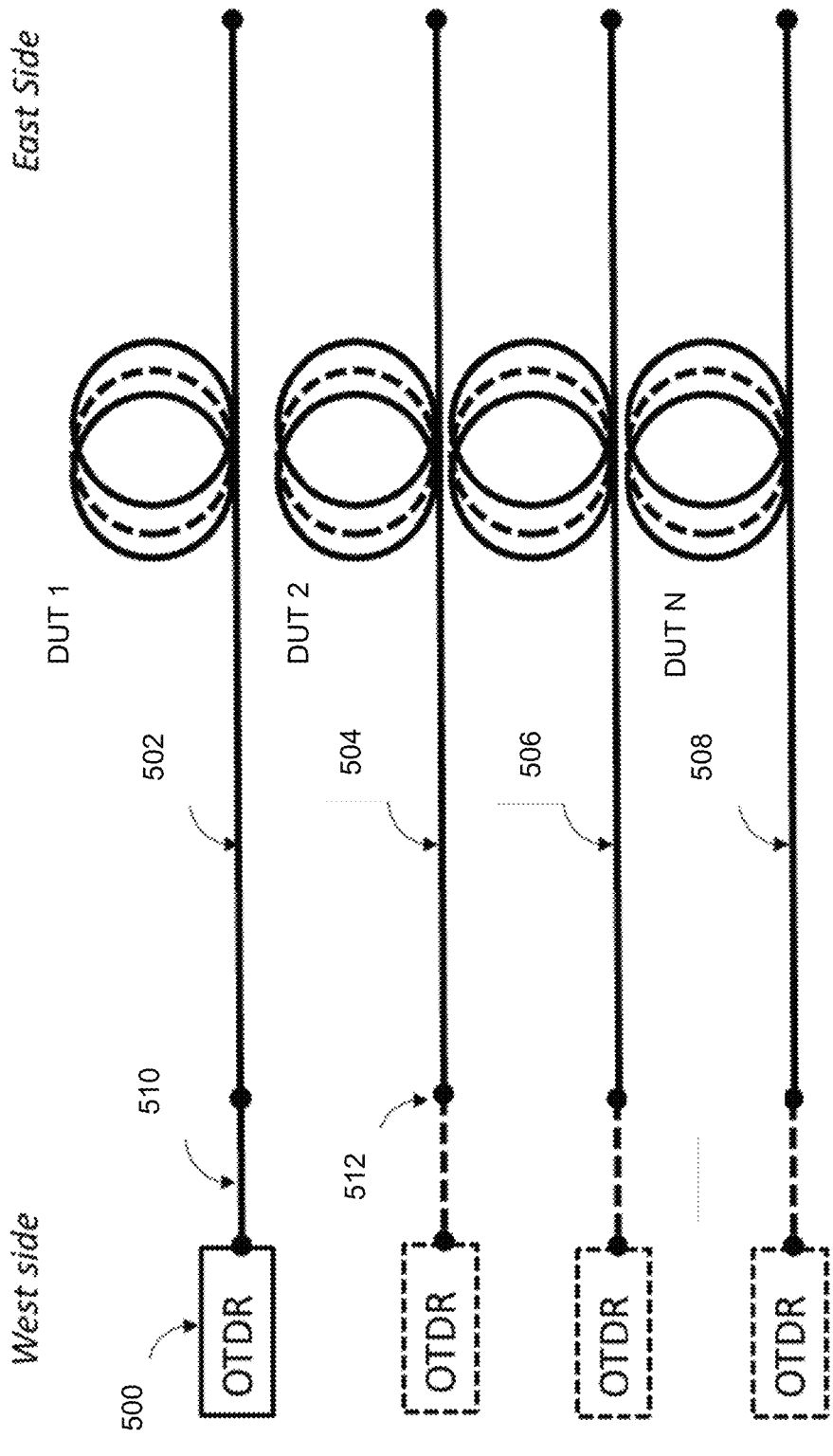
FIG. 5 illustrates an example of operation of the automatic OTDR-based testing apparatus of FIG. 1, in accordance with an example of the present disclosure.

FIG. 5 illustrates an example of operation of the apparatus 100, in accordance with an example of the present disclosure.

Referring to FIG. 5, an OTDR 500 may be used to successively test a plurality (e.g., n) optical fiber links (e.g., fiber optic links 502, 504, 506, and 508) via an optical cord 510. Thus, as soon as the OTDR 500 is connected to the fiber optic link 502 via optical cord 510, the connected fiber optic link 502 is detected, and acquisition may be initiated without human intervention. As soon as the measurement with respect to the fiber optic link 502 is complete, an operator may disconnect the fiber optic link 502, and connect the OTDR 500 at point 512 to the second fiber optic link 504 to be tested. The presence of a new connection to the fiber optic link 504 may be detected, and lead to the launch of a new OTDR measurement and so on until all of the fiber optic links are tested. Thus, the need to launch the acquisition after each new connection may be eliminated based on the automated (e.g., without human intervention) measurement associated with each fiber optic link.

Compared to the configuration of FIG. 5 which implements unidirectional testing associated with a fiber optic link, in bidirectional testing, the fiber optic link characterization technique may utilize the combination of two instruments (e.g., two OTDRs) connected to both ends of the fiber optic link. In such a configuration, the detection of a connected fiber optic link may be directly based on the reception of a signal emitted by the second device connected to the remote end. For example, the signal emitted by the second device may be similar to the signal 104 in that the signal emitted by the second device may indicate to the first device that the fiber optic link is also optically connected to the second device.

Figure 6A:
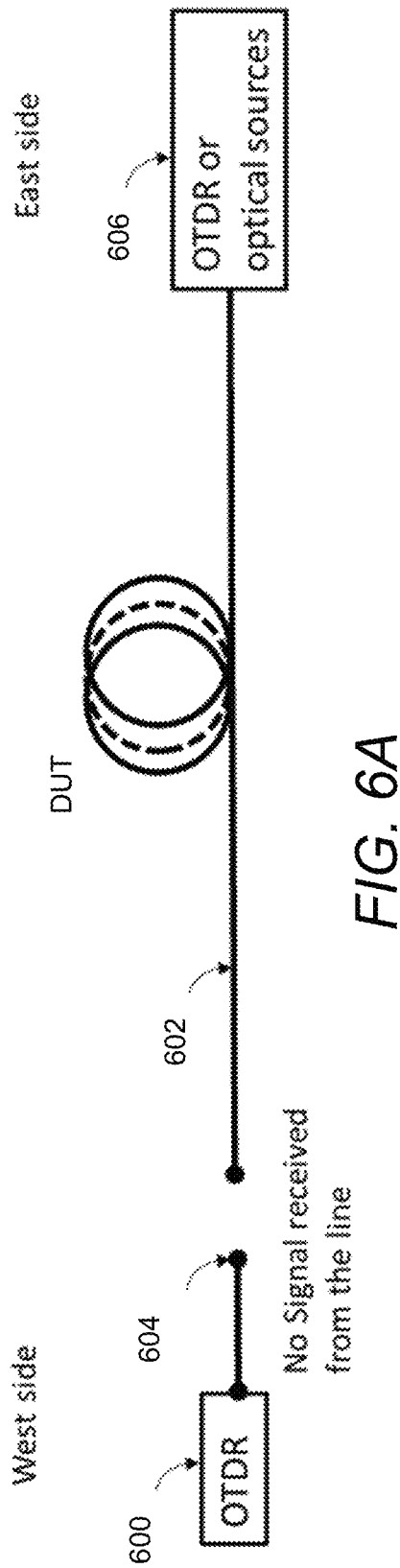
FIGS. 6A and 6B illustrate examples of operation of the automatic OTDR-based testing apparatus of FIG. 1, with respect to detection of a new optical connection and the launch of the OTDR measurement, in accordance with an example of the present disclosure.
Figure 6B:
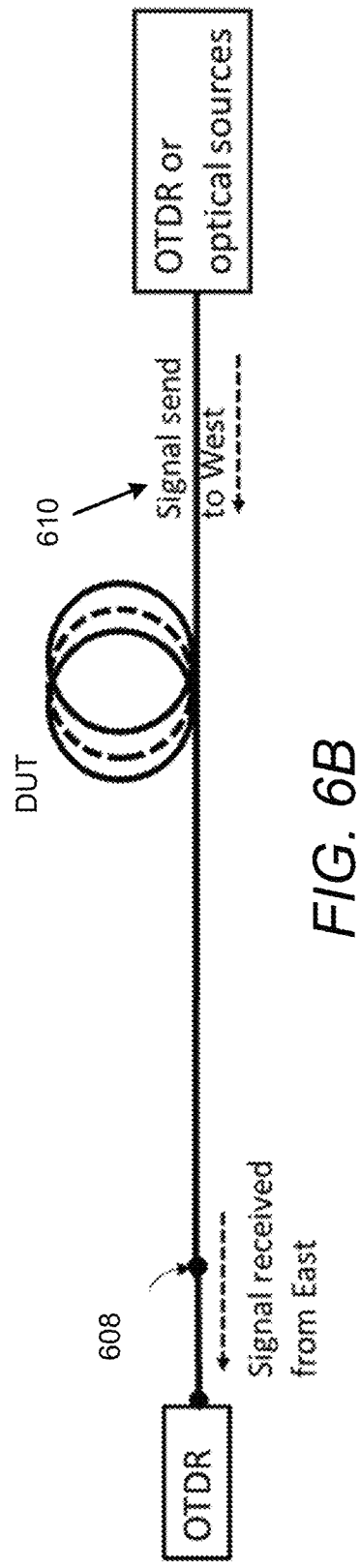

For example, with respect to bidirectional testing of fiber optic links, FIGS. 6A and 6B illustrate examples of operation of the apparatus 100, with respect to detection of a new optical connection and the launch of the OTDR measurement, in accordance with an example of the present disclosure. In this regard, the DUT connection detector 102 may determine, based on analysis of a further signal that is received from the DUT 106 that is to be monitored, whether the DUT 106 is further optically connected an OTDR that is to be optically connected to a remote end of the DUT 106.

Specifically, FIGS. 6A and 6B describe combination of the detection of a new optical connection and the launch of an OTDR measurement. In the case of FIG. 6A, OTDR 600 is not yet connected to DUT 602 via patch cord 604. The OTDR 600 may operate in a monitoring mode for a new optical connection, but does not receive any signal emitted by another instrument 606 (e.g., another OTDR or optical source) connected to the remote end of the DUT 602.

Referring to FIG. 6B, when the DUT 602 is connected at 608, the DUT connection detector 102 may detect that a fiber optic link (e.g., the DUT 602) has just been connected to the OTDR 600 (e.g., by the further signal at 610), and may start the acquisition without any human intervention.

Figure 7A:
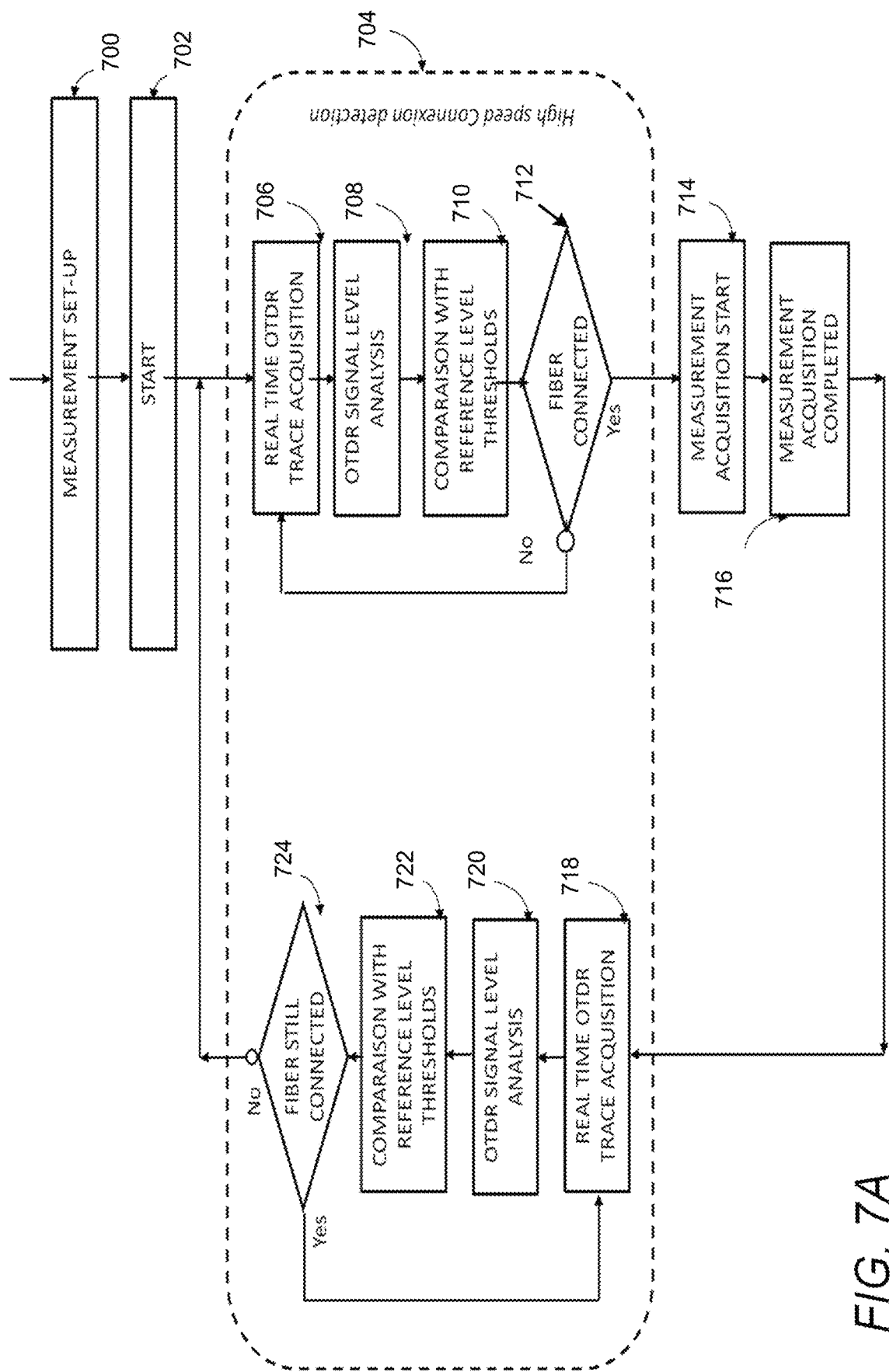
FIG. 7A illustrates a logical flow to illustrate operation of the automatic OTDR-based testing apparatus of FIG. 1 in case of a single OTDR connected to a fiber optic link as illustrated in FIG. 5, in accordance with an example of the present disclosure.

FIG. 7A illustrates a logical flow to illustrate operation of the apparatus 100 in case of a single OTDR connected to a fiber optic link as illustrated in FIG. 5, in accordance with an example of the present disclosure.

Referring to FIG. 7A, at block 700, a measurement set-up of the apparatus 100, which may be an optical reflectometer, such as an OTDR, may be performed. As disclosed in further detail below, if an auto-start mode is enabled for the apparatus 100 and with a measurement set-up that includes, for example, a user-predefined threshold, the apparatus 100 may compare the backscatter level to this threshold and determine if the quality of the connection is acceptable, and if so, start the measurement.

At block 702, once the set-up details are entered, OTDR acquisition may be placed in a start mode to automatically (e.g., without human intervention) start upon connection of the DUT 106.

Block 704 may represent a high speed connection detection and acquisition launch block. In this regard, at block 706, the DUT connection detector 102 may perform OTDR trace acquisition with respect to the DUT 106.

At block 708, the DUT connection detector 102 may determine, based on analysis of a signal 104 that is received from the DUT 106, whether the DUT 106 is optically connected.

At block 710, the DUT connection detector 102 may compare a signal level 110 associated with the signal 104 to a reference level threshold 112.

At block 712, the DUT connection detector 102 may determine, based on comparison (e.g., from block 710) of a signal level 110 associated with the signal 104 to a reference level threshold 112, whether the DUT 106 is optically connected. In this regard, the DUT connection detector 102 may generate, based on a determination that the signal level 110 associated with the signal 104 exceeds the reference level threshold 112, an indication that the DUT 106 is optically connected.

At block 714, if the DUT 106 is optically connected to the apparatus 100, the OTDR acquisition may be performed (without any human intervention). For example, the optical reflectometer controller 108 may perform, based on a determination that the DUT 106 is optically connected, a measurement associated with the DUT 106. In this regard, the measurement may be automatically (e.g., without human intervention) performed upon detection of the optical connection.

At block 716, the OTDR acquisition may be completed.

Referring again to block 712, if the DUT 106 is not connected, processing may revert to block 706 for continued monitoring of the DUT 106 until the DUT 106 is connected. Thus, with respect to blocks 706-716, these blocks represent the process for detecting the presence of a DUT correctly connected to the apparatus 100, and the automatic launch of the OTDR acquisition. In this regard, the optical reflectometer controller 108 may continue to perform OTDR acquisitions until the DUT is disconnected. In order to detect DUT disconnection, blocks 718-724 may provide for detection of DUT disconnection as a prerequisite for a new acquisition.

At block 718, once the OTDR acquisition is completed at block 716, in a similar manner as block 706, the optical reflectometer controller 108 may continue to perform real-time OTDR measurement until the DUT is no longer connected.

At block 720, in a similar manner as block 708, the DUT connection detector 102 may determine, based on analysis of a signal 104 that is received from the DUT 106, whether the DUT 106 remains optically connected.

At block 722, in a similar manner as block 710, the DUT connection detector 102 may compare a signal level 110 associated with the signal 104 to a reference level threshold 112.

At block 724, in a similar manner as block 712, the DUT connection detector 102 may determine, based on comparison (e.g., from block 722) of a signal level 110 associated with the signal 104 to a reference level threshold 112, whether the DUT 106 remains optically connected. In this regard, the DUT connection detector 102 may generate, based on a determination that the signal level 110 associated with the signal 104 exceeds the reference level threshold 112, an indication that the DUT 106 remains optically connected, and continue to block 718. Alternatively, if the DUT 106 is no longer optically connected, processing may proceed to block 706 for a new acquisition (e.g., for a new DUT).

With respect to blocks 718 to 724, after performance of the OTDR acquisition at blocks 714 and 716, the optical reflectometer controller 108 may perform short real-time measurements at block 718 to detect a disconnection (e.g., at blocks 720 and 722) of the DUT. Thus, when the DUT is disconnected from the apparatus 100 by the user or through an optical switch, the disconnection may be detected (e.g., at block 724), and the apparatus 100 may be designated as being ready for detection of a connection of the next DUT (e.g., at blocks 706, 708, etc.).

In order to exit the cycle of successive tests (e.g., several fiber optic links to be tested successively), such tests may be stopped, for example, by a user action (e.g., a start/stop key), or after a pre-defined number of DUTs being tested (e.g., 12 DUTs for a 12 fiber ribbon cable).

Figure 7B:
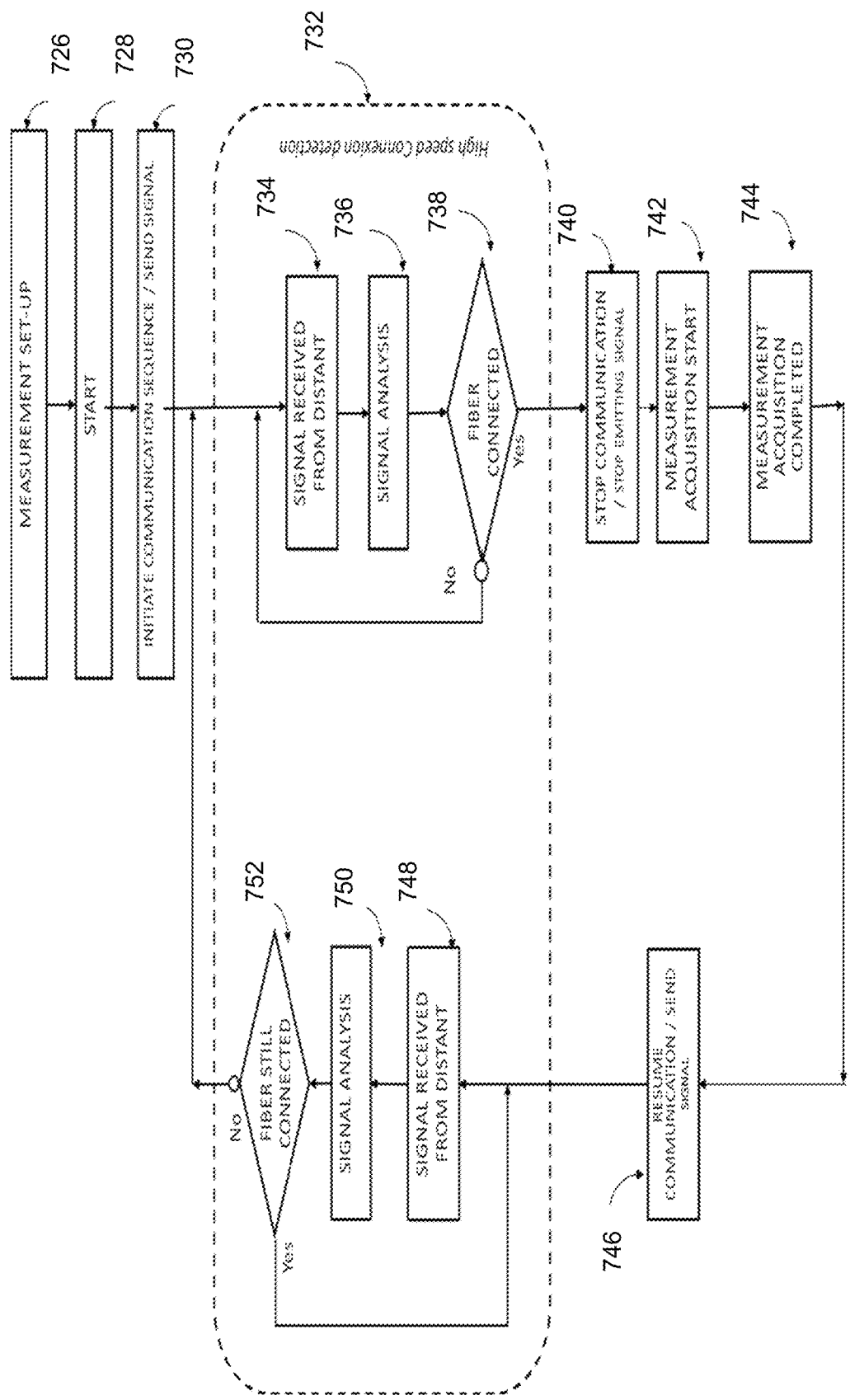
FIG. 7B illustrates a logical flow to illustrate operation of the automatic OTDR-based testing apparatus of FIG. 1 in case of two OTDRs connected to opposite ends of a fiber optic link as illustrated in FIG. 6B, in accordance with an example of the present disclosure.

FIG. 7B illustrates a logical flow to illustrate operation of the apparatus 100 in case of two OTDRs connected to opposite ends of a fiber optic link as illustrated in FIG. 6B, in accordance with an example of the present disclosure.

Referring to FIG. 7B, at block 726, a measurement set-up of the apparatus 100, which may be an optical reflectometer, such as an OTDR, may be performed. If auto-start mode is enabled, the apparatus 100 may compare the received signal to a predefined communication sequence. If a match is obtained between the received signal and the data sequence, the apparatus 100 may automatically detect that another device (e.g., another OTDR) is connected on the other side of the DUT, and therefore that the apparatus 100 is itself connected to a DUT so that it may start the sequence of the measurement.

At block 728, once the set-up details are entered, the apparatus 100 may be placed in a start mode to automatically (e.g., without human intervention) start upon connection of the DUT 106.

Block 730 may represent the starting point of a communication sequence where the DUT connection detector 102 sends a signal to communicate with the remote OTDR.

Block 732 may represent a high speed connection detection and acquisition launch block. In this regard, at block 734, the DUT connection detector 102 may receive a signal (e.g., an emitting signal) from the remote OTDR, and analyze the signal in block 736 in order to detect if the DUT is connected or not connected as disclosed herein with respect to block 738. With respect to block 738, the signal analysis at block 738 may include a decoding of the received signal (e.g., a connection of the remote OTDR may be detected based on detection of a pattern associated to communication between two OTDRs or a modulation which is characteristic of the communication sequence 730). In such a case, the DUT connection detector 102 may consider that the DUT is connected as it receives a communication signal. There may be no indicator of the signal quality in such a structure.

At block 738, if the DUT is connected, the DUT connection detector 102 may determine, based on signal analysis of the received signal (e.g., from block 736) of a signal sent by block 734 of the remote OTDR, whether the DUT 106 is optically connected.

At block 740, if the DUT 106 is optically connected to the apparatus 100, the communication sequence may be stopped automatically in order to start the DUT measurement sequence.

At block 742, if the DUT 106 is optically connected to the apparatus 100, the OTDR acquisition may be performed (without any human intervention). For example, the optical reflectometer controller 108 may perform, based on a determination that the DUT 106 is optically connected, a measurement associated with the DUT 106. In this regard, the measurement may be automatically (e.g., without human intervention) performed upon detection of the optical connection.

At block 744, the OTDR acquisition may be completed.

At block 746, the communication sequence may be resumed between both devices (e.g., the apparatus 100 and the remote OTDR). Such communication may be performed to exchange results, or to follow the sequence of measurement depending on the settings defined in measurement setup at block 726.

At block 748, the apparatus 100 may receive a signal from the remote OTDR as the communication sequence is resumed with block 746. For example, the DUT connection detector 102 may receive a signal from the remote OTDR, and analyze the signal in block 750 in order to detect if the DUT is connected or not connected as disclosed herein with respect to block 752.

With respect to block 752, if the DUT is not connected, processing may proceed to block 732. Alternatively, if the DUT is still connected, processing may revert to block 740.

Figure 8:
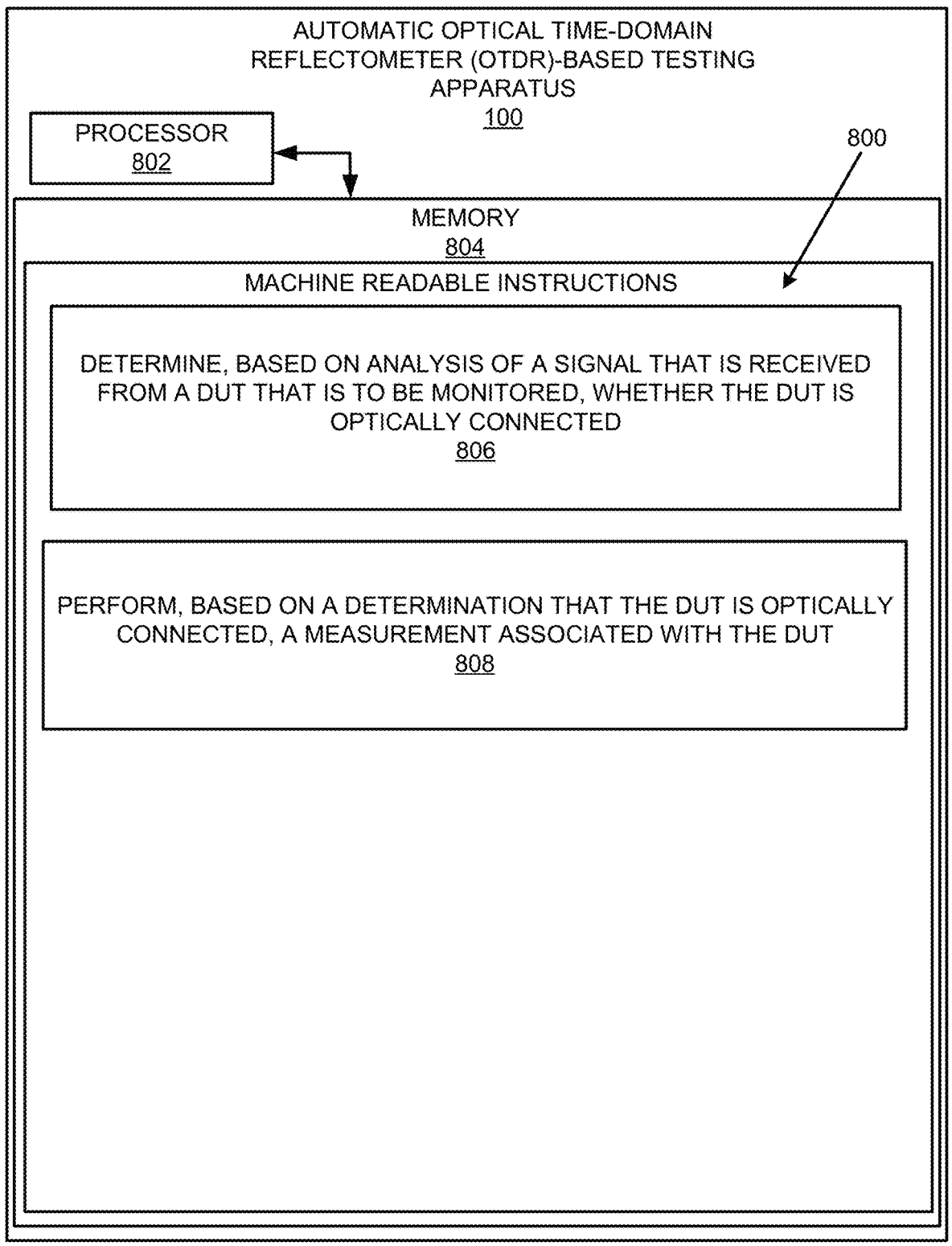
FIG. 8 illustrates an example block diagram for automatic OTDR-based testing in accordance with an example of the present disclosure.
Figure 10:
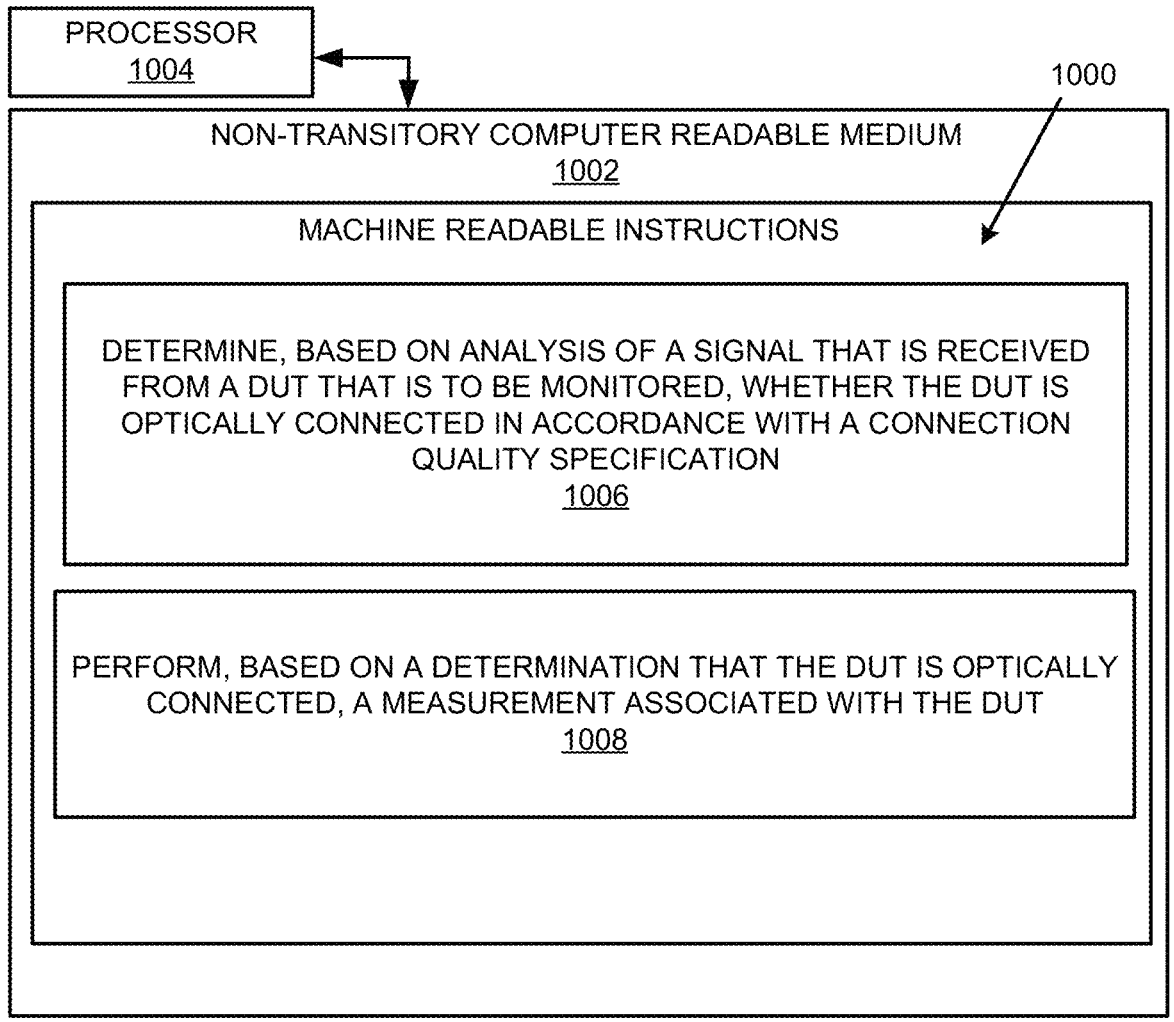
FIG. 10 illustrates a further example block diagram for automatic OTDR-based testing in accordance with another example of the present disclosure.

FIGS. 8-10 respectively illustrate an example block diagram 800, a flowchart of an example method 900, and a further example block diagram 1000 for automatic OTDR-based testing, according to examples. The block diagram 800, the method 900, and the block diagram 1000 may be implemented on the apparatus 100 described above with reference to FIG. 1 by way of example and not of limitation. The block diagram 800, the method 900, and the block diagram 1000 may be practiced in other apparatuses. In addition to showing the block diagram 800, FIG. 8 shows hardware of the apparatus 100 that may execute the instructions of the block diagram 800. The hardware may include a processor 802, and a memory 804 storing machine readable instructions that when executed by the processor cause the processor to perform the instructions of the block diagram 800. The memory 804 may represent a non-transitory computer readable medium. FIG. 9 may represent an example method for automatic OTDR-based testing, and the steps of the method. FIG. 10 may represent a non-transitory computer readable medium 1002 having stored thereon machine readable instructions to provide automatic OTDR-based testing according to an example. The machine readable instructions, when executed, cause a processor 1004 to perform the instructions of the block diagram 1000 also shown in FIG. 10.

The processor 802 of FIG. 8 and/or the processor 1004 of FIG. 10 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 1002 of FIG. 10), such as hardware storage devices (e.g., RAM (random access memory), ROM (read only memory), EPROM (erasable, programmable ROM), EEPROM (electrically erasable, programmable ROM), hard drives, and flash memory). The memory 804 may include a RAM, where the machine readable instructions and data for a processor may reside during runtime.

Referring to FIGS. 1-8, and particularly to the block diagram 800 shown in FIG. 8, the memory 804 may include instructions 806 to determine, based on analysis of a signal 104 that is received from a DUT 106 that is to be monitored, whether the DUT 106 is optically connected.

The processor 802 may fetch, decode, and execute the instructions 808 to perform, based on a determination that the DUT 106 is optically connected, a measurement associated with the DUT 106.

Referring to FIGS. 1-7B and 9, and particularly FIGS. 7B and 9, for the method 900, at block 902, the method may include determining, based on analysis of an emitting signal that is received from an OTDR that is optically connected to a DUT 106 that is to be monitored, whether a first end of the DUT 106 is optically connected to a connection port and a second opposite end of the DUT 106 is optically connected to the OTDR.

At block 904, the method may include performing, based on a determination that the DUT 106 is optically connected to the connection port and to the OTDR, a measurement associated with the DUT 106.

According to examples disclosed herein, the method may further include receiving, after completion of the measurement associated with the DUT, a further emitting signal (e.g., see block 748 of FIG. 7B) from the OTDR that is optically connected to the DUT. Based on analysis of the further emitting signal, a determination may be made as to whether the first end of the DUT continues to be optically connected to the connection port and the second opposite end of the DUT continues to be optically connected to the OTDR (e.g., block 752 of FIG. 7B).

According to examples disclosed herein, the method may further include validating, based on a determination that the first end of the DUT continues to be optically connected to the connection port and the second opposite end of the DUT continues to be optically connected to the OTDR, the measurement associated with the DUT. For example, with reference to FIGS. 7B and 9, once the DUT is determined to be optically connected at block 738, after completion of a measurement at blocks 742 and 744, if the DUT is further determined to remain optically connected to the connection port of the apparatus 100 (e.g., which may be an OTDR) and to the remote OTDR, the determination at block 752 that the DUT continues to be optically connected may serve as a validation of the measurement performed at blocks 742 and 744.

Referring to FIGS. 1-7B and 10, and particularly FIG. 10, for the block diagram 1000, the non-transitory computer readable medium 1002 may include instructions 1006 to determine, based on analysis of a signal 104 that is received from a DUT 106 that is to be monitored, whether the DUT 106 is optically connected in accordance with a connection quality specification.

The processor 1004 may fetch, decode, and execute the instructions 1008 to perform, based on a determination that the DUT 106 is optically connected, a measurement associated with the DUT 106.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An apparatus comprising:
   a device under test (DUT) connection detector, executed by at least one hardware processor, to
   receive a signal from a DUT that is to be monitored,
   analyze a signal level associated with the received signal to determine whether the signal level is greater than a reference level threshold,
   determine, based on the analysis of the signal level, whether the DUT is optically connected in accordance with a connection quality specification, and
   generate, based on a determination that the signal level is greater than the reference level threshold, an indication that the DUT is optically connected; and
   an optical reflectometer controller, executed by the at least one hardware processor, to
   perform, based on a determination that the DUT is optically connected, a measurement associated with the DUT.

2. The apparatus according to claim 1, wherein the DUT includes a fiber optic link.

3. The apparatus according to claim 1, wherein the DUT connection detector is executed by at least one hardware processor to determine, based on the analysis of the signal level, whether the DUT is optically connected by:
   determining, based on analysis of a Rayleigh backscatter power of the signal, whether the DUT is optically connected.

4. The apparatus according to claim 1, wherein the DUT connection detector is executed by at least one hardware processor to determine, based on the analysis of the signal level, whether the DUT is optically connected by:
   determining, based on analysis of a Rayleigh backscatter energy of the signal, whether the DUT is optically connected.

5. The apparatus according to claim 1, wherein the DUT connection detector is executed by at least one hardware processor to determine, based on the analysis of the signal level, whether the DUT is optically connected by:
   determining, based on analysis of an Optical Time Domain Reflectometer (OTDR) front end backscatter level of the signal, whether the DUT is optically connected.

6. The apparatus according to claim 1, wherein the optical reflectometer controller is executed by the at least one hardware processor to:
   perform, based on a set-up that defines a condition for launch of the measurement, the measurement associated with the DUT.

7. The apparatus according to claim 1, further comprising:
   a connection port,
   wherein the DUT connection detector is executed by at least one hardware processor to determine, based on the analysis of the signal level, whether the DUT is optically connected by:
   determining, based on the analysis of the signal level, whether the DUT is optically connected to the connection port.

8. A method comprising:
   determining, based on analysis of an emitting signal that is received from an Optical Time-Domain Reflectometer (OTDR) that is optically connected to a device under test (DUT) that is to be monitored, whether a first end of the DUT is optically connected to a connection port and a second opposite end of the DUT is optically connected to the OTDR by determining, based on analysis of a signal level associated with the emitting signal to determine whether the signal level is greater than a reference level threshold, whether the DUT is optically connected to the connection port and to the OTDR;
   generating, based on a determination that the signal level is greater than the reference level threshold, an indication that the DUT is optically connected to the connection port and to the OTDR; and
   performing, based on the determination that the DUT is optically connected to the connection port and to the OTDR, a measurement associated with the DUT.

9. The method according to claim 8, wherein the DUT includes a fiber optic link.

10. The method according to claim 8, further comprising:
    receiving, after completion of the measurement associated with the DUT, a further emitting signal from the OTDR that is optically connected to the DUT; and
    determining, based on analysis of the further emitting signal, whether the first end of the DUT continues to be optically connected to the connection port and the second opposite end of the DUT continues to be optically connected to the OTDR.

11. The method according to claim 10, further comprising:
    validating, based on a determination that the first end of the DUT continues to be optically connected to the connection port and the second opposite end of the DUT continues to be optically connected to the OTDR, the measurement associated with the DUT.

12. A non-transitory computer readable medium having stored thereon machine readable instructions, the machine readable instructions, when executed by at least one hardware processor, cause the at least one hardware processor to:
    determine, based on analysis of a signal that is received from a DUT that is to be monitored, whether the DUT is optically connected in accordance with a connection quality specification by determining, based on analysis of a signal level associated with the signal to determine whether the signal level is greater than a reference level threshold, whether the DUT is optically connected;
    generate, based on a determination that the signal level is greater than the reference level threshold, an indication that the DUT is optically connected; and
    perform, based on the determination that the DUT is optically connected, a measurement associated with the DUT.

13. The non-transitory computer readable medium according to claim 12, wherein the DUT includes a fiber optic link.

14. The non-transitory computer readable medium according to claim 12, wherein the machine readable instructions to determine, based on analysis of the signal that is received from the DUT that is to be monitored, whether the DUT is optically connected in accordance with the connection quality specification, when executed by the at least one hardware processor, further cause the at least one hardware processor to:
    determine, based on analysis of a Rayleigh backscatter power of the signal, a Rayleigh backscatter energy of the signal, or an Optical Time Domain Reflectometer (OTDR) front end backscatter level of the signal, whether the DUT is optically connected.

15. The non-transitory computer readable medium according to claim 12, wherein the machine readable instructions, when executed by the at least one hardware processor, further cause the at least one hardware processor to:

perform, based on a set-up that defines a condition for launch of the measurement, the measurement associated with the DUT.

16. The non-transitory computer readable medium according to claim 12, wherein the machine readable instructions to determine, based on analysis of the signal that is received from the DUT that is to be monitored, whether the DUT is optically connected in accordance with the connection quality specification, when executed by the at least one hardware processor, further cause the at least one hardware processor to:

determine, based on analysis of the signal that is received from the DUT that is to be monitored, whether the DUT is optically connected to a connection port.

* * * * *